(12) United States Patent
Lin

(10) Patent No.: US 7,773,604 B2
(45) Date of Patent: **\*Aug. 10, 2010**

(54) SYSTEM DIRECTING FLOW OF PACKETS BY-PASSING POLICY-BASED APPLICATION FOR PROCESSING BY POLICY ENGINE ACCORDING TO ACTION SPECIFICATION IN POLICY CACHE

(75) Inventor: YeeJang James Lin, San Jose, CA (US)

(73) Assignee: WatchGuard Technologies, Inc., Seattle, WA (US)

( \* ) Notice: Subject to any disclaimer, the term of this patent is extended or adjusted under 35 U.S.C. 154(b) by 181 days.

This patent is subject to a terminal disclaimer.

(21) Appl. No.: 12/145,751

(22) Filed: Jun. 25, 2008

(65) Prior Publication Data
US 2008/0285446 A1    Nov. 20, 2008

Related U.S. Application Data

(63) Continuation of application No. 11/346,899, filed on Feb. 3, 2006, now Pat. No. 7,420,976, which is a continuation of application No. 10/360,671, filed on Feb. 7, 2003, now Pat. No. 7,006,502, which is a continuation of application No. 09/465,123, filed on Dec. 16, 1999, now Pat. No. 6,542,508.

(60) Provisional application No. 60/112,976, filed on Dec. 17, 1998.

(51) Int. Cl.
*H04L 12/28* (2006.01)

(52) U.S. Cl. ............... 370/395.43; 370/360; 370/395.3

(58) Field of Classification Search .............. 709/224, 709/238, 228; 370/395.43, 360, 395.3, 389, 370/398, 229, 358, 397
See application file for complete search history.

(56) References Cited

U.S. PATENT DOCUMENTS

| | | | |
|---|---|---|---|
| 5,371,852 | A | 12/1994 | Attanasio et al. |
| 5,473,599 | A | 12/1995 | Li et al. |
| 5,574,720 | A | 11/1996 | Lee et al. |
| 5,781,549 | A | 7/1998 | Dai |
| 5,884,312 | A | 3/1999 | Dustan et al. |
| 6,006,259 | A | 12/1999 | Adelman et al. |
| 6,101,543 | A | 8/2000 | Alden et al. |
| 6,157,955 | A | 12/2000 | Narad et al. |
| 6,167,445 | A | 12/2000 | Gai et al. |
| 6,173,399 | B1 | 1/2001 | Gilbrech |
| 6,208,640 | B1 | 3/2001 | Spell et al. |

(Continued)

OTHER PUBLICATIONS

Abadi, M., et al., "Secure Web Tunneling," http://pa.bell-labs.com/~abadi/papers/tunnel/206.html, pp. 1-13 (Dec. 16, 2000).

(Continued)

*Primary Examiner*—Le Luu
(74) *Attorney, Agent, or Firm*—Kory D. Christensen; Stoel Rives LLP

(57) ABSTRACT

A hardware-based policy engine that employs a policy cache to process packets of network traffic. The policy engine includes a stream classifier that associates each packet with at least one action processor based on data in the packet, and the action processor further acts on the packets based on the association determined by the stream classifier.

3 Claims, 3 Drawing Sheets

U.S. PATENT DOCUMENTS

| | | | |
|---|---|---|---|
| 6,208,655 | B1 | 3/2001 | Hodgins et al. |
| 6,226,748 | B1 | 5/2001 | Bots et al. |
| 6,226,751 | B1 | 5/2001 | Arrow et al. |
| 6,286,052 | B1 | 9/2001 | McCloghrie et al. |
| 6,502,131 | B1 | 12/2002 | Vaid et al. |
| 6,542,508 | B1 | 4/2003 | Lin |
| 6,578,077 | B1 | 6/2003 | Rakoshitz et al. |
| 6,608,816 | B1 | 8/2003 | Nichols |
| 6,701,437 | B1 | 3/2004 | Hoke et al. |

OTHER PUBLICATIONS

"Intel ISP Program Case studies: UUNET Canada Leads the Industry in Move to Virtual Private Networks," http://www.intel.com/isp/casestudies/uunet.htm, pp. 1-4 (2000).

"Tunnel Switching: 3Com Technology Boost VPN Security and Flexibility," http://www.3com.com/technology/tech_net/white_papers/503049.html., pp. 10 (1999).

Virtual Multi-Megabit Access' Path: Affordable and Available Internet and IP Access at Speeds Greater than T1, http://www.tiaranetworks.com/vmapwp.html, pp. 1-9 (1999).

Web Workshop—Virtual Private Networking: An Overview, http://msdn.Microsoft.com/workshop/server/feature/vpnovw.asp, pp. 1-16 (May 29, 1998).

Ferguson, Paul and D. Senie, "Network Ingress Filtering: Defeating Denial of Service Attacks Which Employ IP Source Address Spoofing," http://andrew2.andrew.cmu.edu/rfc/rfc2267.html, pp. 1-8 (Jan. 1998).

"The NetBoost Policy Engine: Comprehensive Plateform Enables Today's Leading Policy Enforcement Applications to Operate at Full Wire Speed," NetBoost Corporation, 2 pages, (1998).

"The NetBoost Policy Appliance: Device Enables Concurrent Operation of Multiple Policy Enforcement Applications to Operate at Full Wire Speed," NetBoost Corporation, 2 pages (1998).

"Net Boost PE—1000: Network Application Engine," NetBoost Corporation, 1 pages (1998).

"NetBoost SKD: Software Development Kit," Net Boost Corporation, 1 page (1998).

"A New Breed: The Net Boost Platform for Policy Enforcement Applications," NetBoost Corporation, pp. 1-11 (1998).

Russell, Paul, "Keeping the TCP/IP Stream Flowing," Linux Magazine, http://www.linuxmag.com/1999-08/bestdefense02.html, pp. 1-8 (Aug. 1999).

SYSTEM DIRECTING FLOW OF PACKETS BY-PASSING POLICY-BASED APPLICATION FOR PROCESSING BY POLICY ENGINE ACCORDING TO ACTION SPECIFICATION IN POLICY CACHE

RELATED APPLICATIONS

This application is a continuation of U.S. patent application Ser. No. 11/346,899 filed Feb. 3, 2006 now U.S. Pat. No. 7,420,976, which is a continuation of U.S. patent application Ser. No. 10/360,671 filed Feb. 7, 2003 now U.S. Pat. No. 7,006,502, which is a continuation of application, Method for Synchronization of Policy Cache with Various Policy-based applications, Ser. No. 09/465,123, filed on Dec. 16, 1999, now U.S. Pat. No. 6,542,508, and claims the benefit of priority to U.S. Provisional Patent Application No. 60/112,976, filed Dec. 17, 1998. This application claims the benefit of priority to all of the above patent applications and patent.

TECHNICAL FIELD

The present invention relates to policy-based network equipment and, in particular, to policy-based network equipment that employs a favorable division of hardware and software to provide both performance and flexibility.

BACKGROUND

Some typical policy-based computer network applications are Virtual Private Networks (VPN), Firewall, Traffic Management, Network Address Translation, Network Monitoring, and TOS Marking. In general, the policy-based application has access to the network media through an operating system driver interface. In a typical network architecture, the policy-based application examines every packet coming in from the network along the data path, compares It against flow classification criteria, and performs the necessary actions based upon the policies defined in a policy database.

Today's policy-based applications are challenged with several key issues. These issues can be major inhibitors for the future growth of the emerging industry:

1) Flow classification overhead—Flow classification specifications 25 can be complicated and lengthy for each network service. As can be seen from FIG. 1, in a conventional policy-based application, each packet compared with potentially hundreds of rules in order to find the matching one and determine the proper action specifications. With stateful applications, state tracking is even more time consuming. Multiple network services on a single system simply make matters worse.

As is also shown in FIG. 1, the process of flow classification and action processing may repeat for many iterations as multiple policies are activated at the same time. For example, a VPN (virtual private network) application may comprise Firewall Policy, IPSEC Policy, IPCOMP (IP compression) policy, NAT (Network Address Translation) Policy, QoS (Quality of Service) policy, Monitoring Policy, L2TP/PPTP (L2 Tunnel Protocol/Point To Point Tunnel Protocol) Tunnel Policy, and so on.

The flow classification is a rule based operation that can be very flexible to tune to application needs. For example, it may define a rule to identify packets with a pattern of any random byte within a packet, and/or across many packets. The flow classifiers may also differ per action processor for performance optimization. As a result the matching criteria used by a flow classifier to classify a flow may include a specific value, a range, or wildcard on interface port numbers, protocols, IP addresses, TCP ports, applications, application data, or any user specifiable criteria. The distinctions of various implementation makes it difficult to cache a flow with its decision in many ways.

2) Flow classification technique is evolving—Flow classification and analysis technique is more than just looking into the packet's address, port number and protocol type and or other header information. It often involves state tracking for newer applications. This technique is being continuously modified and, therefore, is not practically appropriate for a hardware based implementation. Furthermore, flow classification techniques are often viewed as key differentiaters between vendors.

3) Action execution speed—Once the classification process is complete, the proper actions need to be executed. Some of the actions are simple like a discard or forwarding decision for a firewall, while some others are extremely time consuming, like triple-DES encryption and SHA hashing algorithm or QOS scheduling algorithm. Software based implementations cannot keep up with the bandwidth expansion as newer and faster media technologies are employed.

4) Integrated services—As more and more policy-based applications 10 become available, it is desirable to provide integrated services on a single platform because this ostensibly reduces policy management complexity, avoids potential policy conflicts, and lowers the TCO (Total Cost of Ownership). On the other hand, Integrated Services impose a very large computing power requirement that cannot be practically achieved with off-the-shelf general purpose machines. A disadvantage of the conventional architecture is that, because it is primarily software-based, it is relatively high overhead. However, precisely because it is software-based, it is quite flexible.

What is desired is a policy architecture has the flexibility of present flow classification systems, but that also has lower overhead.

DETAILED DESCRIPTION

Figure 1:
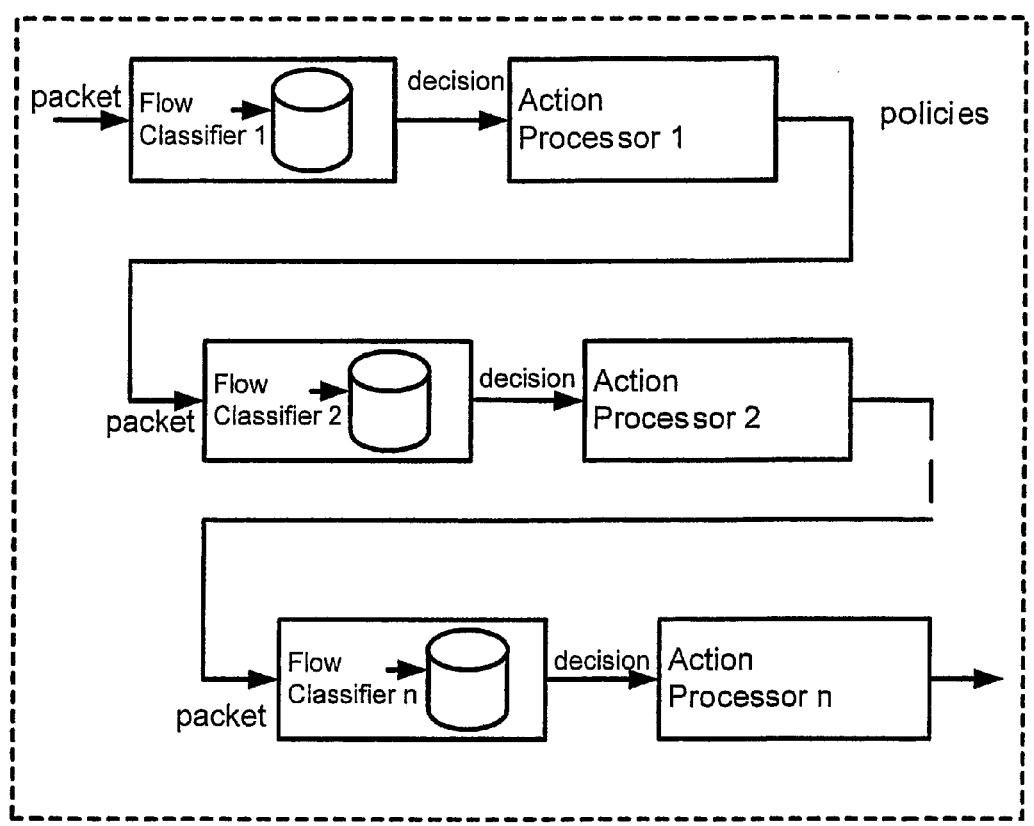
FIG. 1 is a block diagram illustrating conventional flow classification and action processing.
Figure 2:
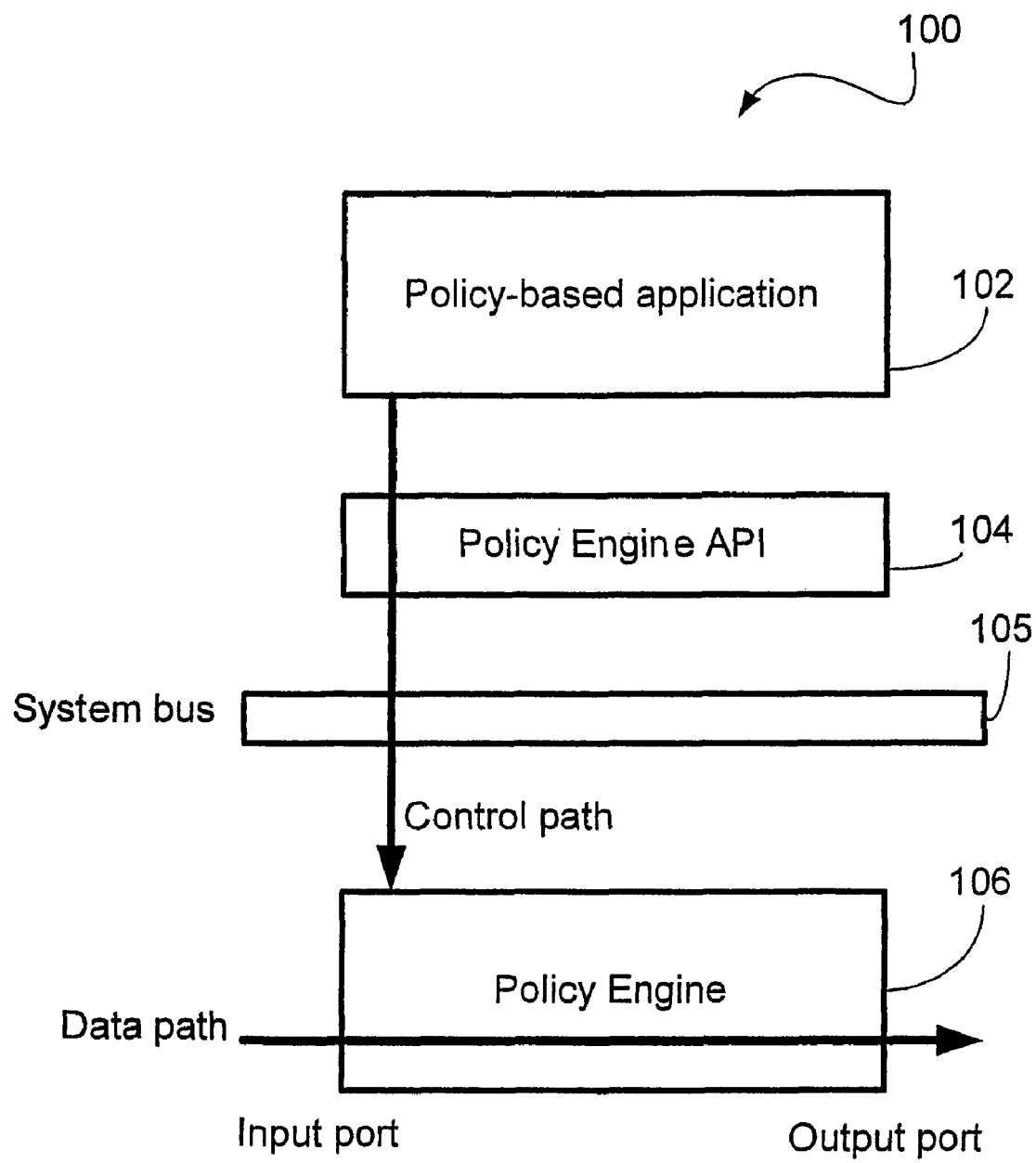
FIG. 2 is a block diagram illustrating the a broad aspect of a policy architecture in accordance with an embodiment of the invention.
Figure 3:
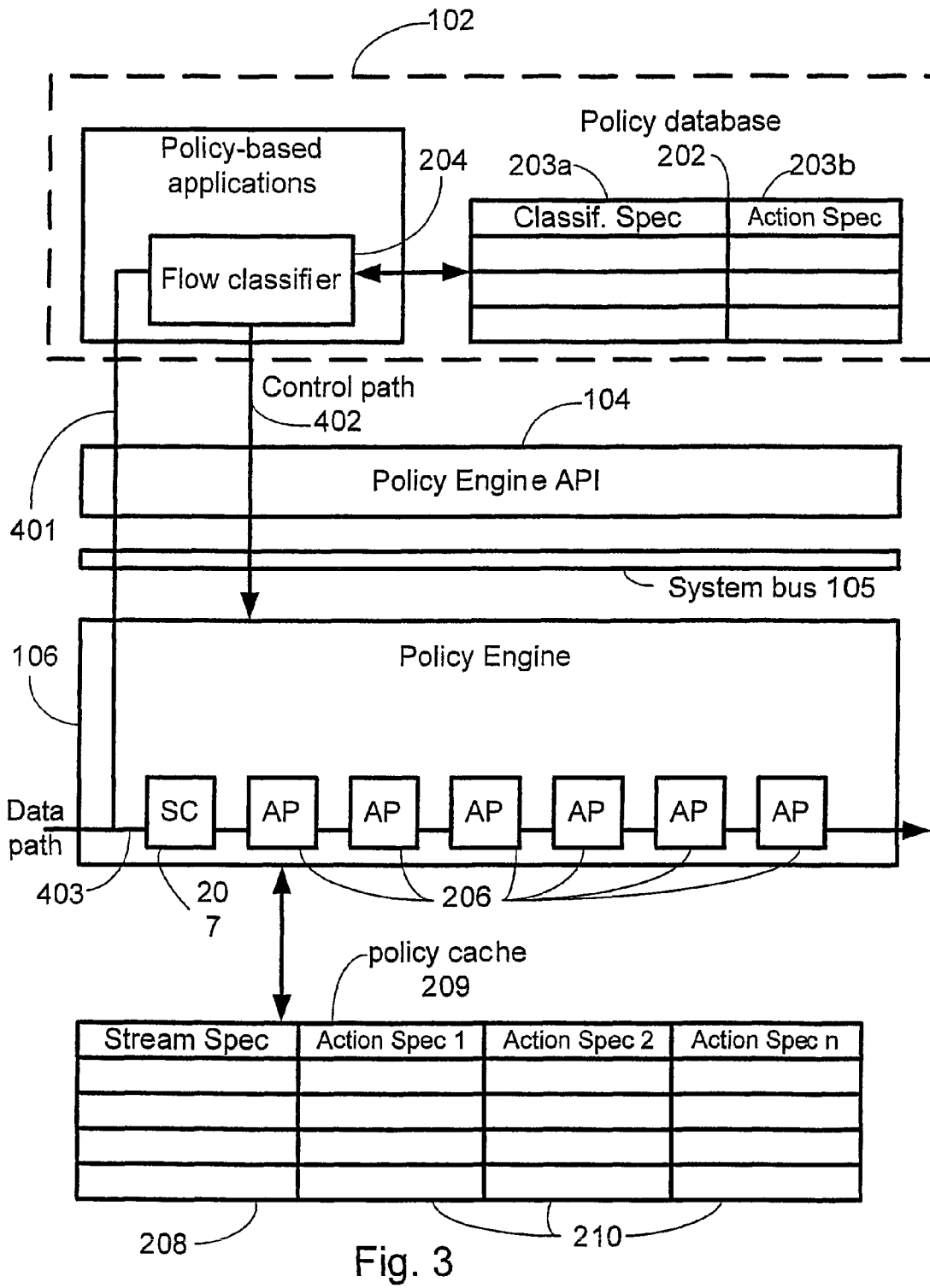
FIG. 3 is a block diagram illustrating details in accordance with one embodiment of FIG. 2.

As shown broadly in FIG. 2 and in greater detail in FIG. 3, in accordance with one embodiment of the invention, an architecture 100 for applying policies to network data traffic allocates the application of policies between software and hardware such that the system is flexible yet efficient.

The architecture 100 includes three major components—a Policy-Based Application 102, a Policy Engine API 104 ("API" stands for Application Program Interface') and a Policy Engine 106. As can be seen from FIGS. 2 and 3, the policy-based application 102—such as a firewall, virtual private network (VPN), or traffic management—is typically a "legacy" software program residing on a host, equipped with its own policy database 202 and flow classifier logic 204.

The policy engine API 104 serves as an interface between the policy application 102 and the policy engine 106 (via a system bus 105). The policy engine 106 is a purpose-built hardware (preferably running at wire speed) that operates on input network traffic and network policies and that outputs regulated traffic flows based upon the network policies.

In a typical embodiment, the policy engine API 104 provides the policy-based application 102 access to all the media I/O through a generic operating system driver interface. In addition, the API 104 allows the application 102 to invoke acceleration functions (shown in FIG. 3 as application processors 206, or "AP's") provided by the policy engine 106. The application processors 206 operate based on the stream classifier 207 of the policy engine 106 determining that a packet belongs to a particular stream and activating the appropriate action processors 206 according to action specifications 210 in a policy cache 209. That is, overall system performance is enhanced by virtue of the appropriate acceleration functions (action processors 206) of the policy engine 106 being activated to regulate the network traffic.

Before proceeding, several terms are defined in the context of FIGS. 2 and 3. The definitions provided herein are meant to be explanatory, and not necessarily limiting when a similar or identical term is used in the claims.

Service

A service in a policy-based network defines a network application 102 that is controlled and managed based on a set of policies. Typical services are firewall, VPN, traffic management, network address translation, network monitoring, etc.

Policy

Policies (normally defined by network managers) are collectively stored in a policy database 202 accessible to the policy-based applications 102 (even conventionally) and describe network traffic behaviors based upon business needs. A policy specifies both what traffic is to be subject to control and how the traffic is to be controlled. Thus, a policy typically has two components—a flow classification specification 203a and an action specification 203b.

Flow Classification Specification 203a

A flow classification specification 203a provides the screening criteria for the flow classifier logic 204 to sort network traffic into flows. A flow classification specification 203a can be very elaborate, as detailed as defining a specific pair of hosts running a specific application. Alternately, a flow classification specification 203a can have a simple wildcard expression.

Action Specification 203b

An action specification 203b describes what to do with packets that match an associated flow classification specification 203a. The action specification 203b can be as simple, for example, as a discard or forward decision in the firewall case. It can also be as complicated as IPSec encryption rules based on a SA (Security Association) specification.

Flow

All packets that match the same flow classification specification 203a form a flow.

Flow Classifier

Referring again to FIG. 3, a policy decision is at least initially derived by a policy-based application from the policy database 202. As discussed above, a flow is a stream of correlated packets to which policy decisions apply. With the described embodiments in accordance with the invention, referring again specifically to FIG. 3, for at least some of the packets, a flow classifier 204 classifies the packet according to one or more classification specifications 203a and finds one or more corresponding action specifications 203b. The found action specifications 203b are then provided to the policy cache 209 for later execution by the policy engine 106 to enforce the policy.

Policy Binding

Policy binding is the process of the flow classifier 204 binding a stream with its associated action specification and loading the appropriate entries (stream specification 208 and action specifications 210) into the policy cache 209.

Stream

A stream is an "instantiation" of a flow—packets that have the same source and destination address, source and destination port, and protocol type. (Optionally, the application can add the input and output media interface to the stream classification criteria in addition to the packet header if desired.) Packets may be sorted into streams, and a flow may include one or more streams. All packets belonging to the same stream are to be regulated by the same policy.

Policy Cache 209

At the completion of the policy binding process, an entry for a given stream is created on the policy engine which contains all the policy information required to subsequently process data of the stream.

Integrated Services

When multiple network services are to apply to the same flow, this is called "Integrated Services." Integrated Services simplify the management of various service policies, minimize potential policy conflicts and reduce TCO (Total Cost of Ownership).

Stream Specification

A stream specification 208, shown in FIG. 3 held in policy cache 208 is the criteria used by the stream classifier 207 to uniquely identify a stream. In one embodiment, the stream specification 208 is compared to a 5-tuple in a packet header—source and destination address, source and destination port, and protocol type.

Action Processor 206

Each action processor 206 executes an action based upon an action specification 210 in the policy cache 209.

Packet Tagging

Certain applications (e.g. Network Monitoring) would like to receive flows based on the flow classification specification and would prefer that flow classification be performed for them. Packet tagging is a way of tagging all incoming packets with an application specified "tag."

Policy-Based Application

A policy-based application provides a service to the network users. This service is managed by a set of policies. Firewall, VPN and Traffic Management are the most typical policy-based applications. As the industry evolves, policy-based applications are likely to consolidate onto a single platform called Integrated Services. Integrated Services has the benefits of centralized policy management and lower cost of ownership.

Referring still to FIG. 3, the population and use of the policy cache 209 is now discussed in greater detail. As discussed above, the policy-based application 102 (typically a legacy application) is equipped with its own policy database 202 and flow classifier logic 204. Some of the packets of a stream are provided (via a data path shown logically as 401 in FIG. 3) to the flow classifier 204. The flow classifier 204 uses the policy database 202 to determine the action specifications 203b that correspond to the policies of the flow to which the stream belongs. The action specifications are provided (via the path shown logically as 402 in FIG. 3) to the policy cache 209. It should be noted that multiple packets may be required for more sophisticated flow classification (stateful packet inspection), since the policy decisions (action specifications) may come from different applications which may have implemented different flow classifiers. In those cases, the application's flow classification logic keeps track of the flow's state until a matching criteria is met. Preferably, though, just enough packets of a stream are provided to the flow classification logic 204 via the logical path 401 to properly determine the action specifications 203*b* for the stream. At the end of the "learning phase," the application software 102 has uniquely identified a policy for the incoming packet stream.

Subsequent packets of the stream are then provided directly to the stream classifier 207 of the policy engine 106 via the logical data path 403. Using the policy cache 209, the stream classifier 207 determines which action processors 206 are to be activated for the packets of the stream. Specifically, the stream classifier 207 matches the packets to a particular stream specification 208 and then, using the corresponding action specifications 210, activates the proper action processors 206. Significantly, these "subsequent packets" can be acted upon without any interaction to the "host" policy-based application 102. The application need not "see" any packets belonging to that stream after the binding (unless the stream is actually destined for the host.). The action processors are specialized in executing specific action specifications, preferably at the wire speed.

Thus, in summary, upon the completion of the policy binding "learning" process, the policy engine 106 may immediately take control of the bound stream and execute the appropriate actions in accordance with the action specifications 210 in the policy cache 209 without any intervention from the "host" (policy-based) application. This method also relieves the policy engine 106 hardware from doing complicated pattern matching because it can simply compute a hash value (or use some other identification function) from the well known fields (which uniquely identify a stream) of the packet to find its corresponding policy decisions (action specifications 210). The classification need not be done more than once for each packet even though there may be multiple applications. As a result, massive computing power is not required to do the classification on an ongoing basis. A benefit is inexpensive hardware cost for very high performance policy-based applications.

It can be seen that in accordance with the present invention, use of the policy engine and policy cache not only addresses many if not all of the performance considerations discussed above in the Background, but also preserves a great amount of flexibility in setting network policies and the following considerations are taken into account.

1) Time-to-market for application developers—Since time-to-market is a major concern for application vendors, the PAPI design minimizes the development effort required by the application developers in order for the existing applications to take advantages of the policy engine's enhanced performance.

2) Maintain flexibility for developers' value-added—PAPI may allow application developers to enhance or maintain their value-add so that vendors' differentiation is not compromised.

3) Platform for integrated services—PAPI has the model of an integrated services platform in mind. Application developers can, over time, migrate their services into an integrated platform without worrying about the extensibility of the API and the performance penalty.

I claim:

1. A computer readable storage medium having instructions stored thereon that when executed on a processor causes said processor to process a flow a packets over a computer network by:

binding the flow of packets by a policy-based application to a policy in a policy cache;

directing the flow of packets to a policy engine, the flow of packets by-passing the policy-based application; and processing the flow of packets by the policy engine according to action specifications in the policy cache.

2. The computer readable storage medium of claim 1 further including instructions for calculating a hash value for a packet.

3. The computer readable storage medium of claim 2 further including instructions for selecting an action specification based on the hash value.

* * * * *